UNITED STATES PATENT OFFICE.

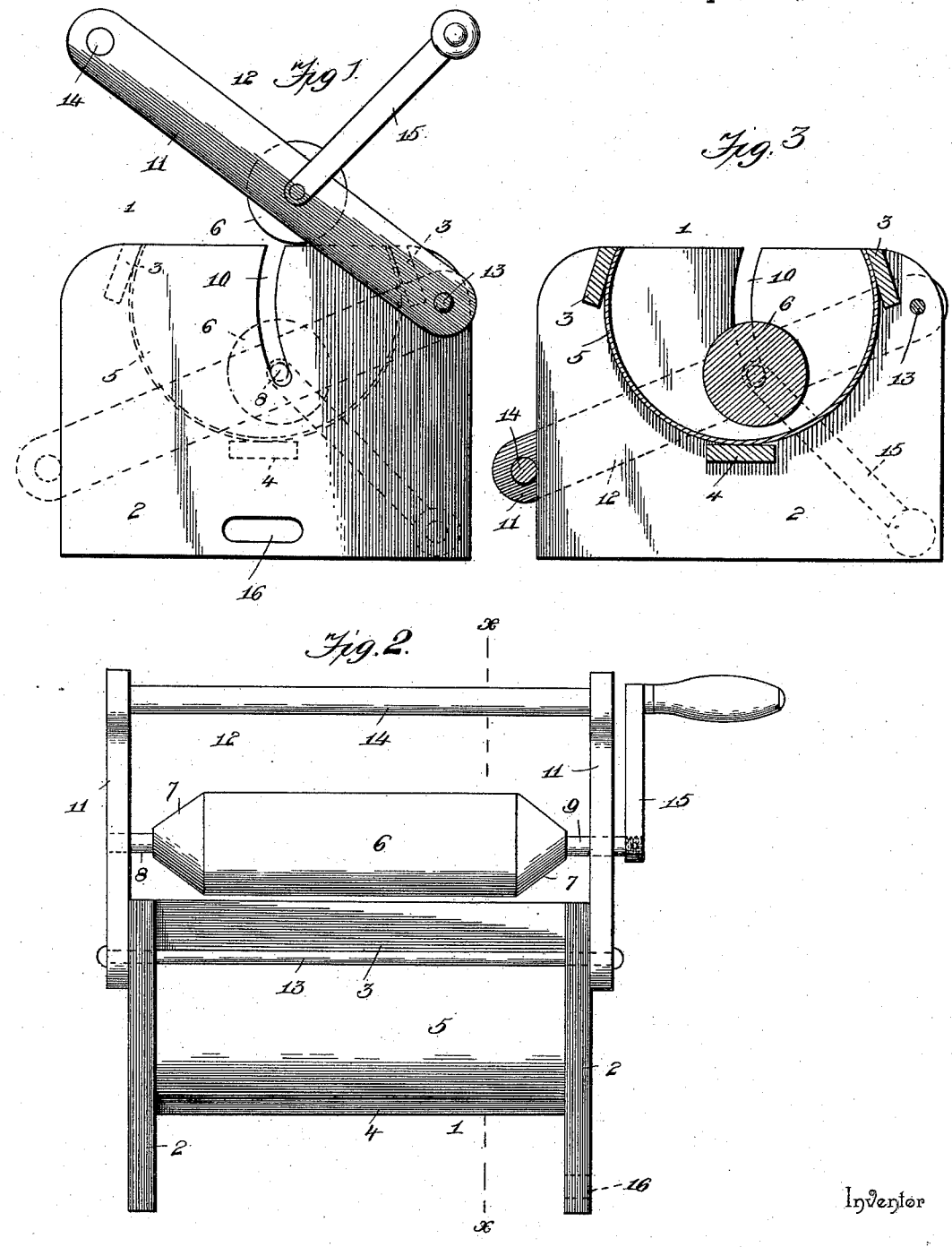

WILLIAM J. WOODS, OF MINNEAPOLIS, MINNESOTA.

DOUGH-KNEADER.

SPECIFICATION forming part of Letters Patent No. 567,777, dated September 15, 1896.

Application filed August 21, 1895. Serial No. 560,042. (No model.)

*To all whom it may concern:*

Be it known that I, WILLIAM J. WOODS, a citizen of the United States, residing at Minneapolis, in the county of Hennepin and State of Minnesota, have invented a new and useful Dough-Kneader, of which the following is a specification.

The invention relates to improvements in dough-kneaders.

The object of the present invention is to improve the construction of dough-kneaders and to provide a simple and inexpensive machine adapted to be conveniently operated and capable of exerting the desired pressure and of rapidly working dough.

The invention consists in the construction and novel combination and arrangement of parts hereinafter fully described, illustrated in the accompanying drawings, and pointed out in the claim hereto appended.

In the drawings, Figure 1 is an end elevation of a dough-kneader constructed in accordance with this invention. Fig. 2 is a side elevation of the same. Fig. 3 is a vertical sectional view on the line $x\, x$ of Fig. 2.

Like numerals of reference indicate corresponding parts in all the figures of the drawings.

1 designates a supporting-frame comprising similar ends 2 and longitudinally-disposed bars 3 and 4, arranged horizontally and located at the bottom and upper edges of a trough 5. The trough is constructed of sheet metal, and is substantially semicylindrical or segmental in cross-section, and its end edges are arranged in curved kerfs of the inner faces of the ends 2.

Within the trough is arranged a rolling-pin or roll 6, having tapered ends 7 and provided with journals 8 and 9, extending through curved slots 10 of the ends 2 of the supporting-frame and fitting in bearing-openings of sides 11 of a lever-frame 12, which is rectangular. The lever-frame 12 is composed of parallel sides 11, arranged on the outer faces of the ends 2 of the trough, fulcrumed at their rear ends by a longitudinal rod 13 and having their front ends connected by a handle-bar 14, located at the other ends of the sides of the handle-frame and arranged to clear the upper portion of the ends of the supporting-frame, and this frame is adapted to raise and lower the roll and to regulate the pressure exerted by the same on the dough or mixture.

The journal 9 is extended beyond the lever-frame and has secured to it a crank-handle 15, by which the roll is operated. The roll is adapted to be rapidly rotated in either direction, and the machine is capable of rapidly kneading dough.

One end of the supporting-frame is provided with a slot or opening 16, adapted to receive the jaw of a clamp to enable the dough-kneader to be supported on a table, bench, or the like.

It will be seen that the dough-kneader is simple and comparatively inexpensive in construction, that it is capable of being conveniently operated, and that the trough affords ready access to the mixture to enable flour or the like to be added, as desired.

Changes in the form, proportion, and the minor details of construction may be resorted to without departing from the principle or sacrificing any of the advantages of this invention.

What I claim is—

A dough-kneader, comprising a supporting-frame composed of parallel ends having substantially vertically-disposed curved slots, and connections between the ends of the frame, a trough arranged within the frame adjacent to said slots and having a curved bottom, a roll provided with journals passing through said slots, and a substantially rectangular lever-frame composed of sides arranged on the outer faces of the ends of the supporting-frame and permanently fulcrumed at their rear terminals in rear of the trough and provided at points intermediate of their ends with bearings receiving said journals, and a handle connecting the front ends of the sides of the handle-frame and arranged to clear the upper portion of the front of the supporting-frame, substantially as and for the purpose described.

In testimony that I claim the foregoing as my own I have hereto affixed my signature in the presence of two witnesses.

WILLIAM J. WOODS.

Witnesses:
E. C. MORSE,
OTTO E. NAEGELE.